United States Patent [19]

Wada et al.

[11] Patent Number: 5,232,880
[45] Date of Patent: Aug. 3, 1993

[54] METHOD FOR PRODUCTION OF NONREDUCIBLE DIELECTRIC CERAMIC COMPOSITION

[75] Inventors: Nobuyuki Wada, Shiga; Yoshiaki Kohno, Moriyama; Shozo Kojima, Oumihachiman; Syunsuke Nakaya, Youkaichi, all of Japan

[73] Assignee: Murata Manufacturing Co., Ltd., Japan

[21] Appl. No.: 818,294

[22] Filed: Jan. 9, 1992

[30] Foreign Application Priority Data

Jan. 11, 1991 [JP] Japan ................................... 3-13830
Feb. 16, 1991 [JP] Japan ................................... 3-44401

[51] Int. Cl.$^5$ ............................................. C04B 35/46
[52] U.S. Cl. .................................... 501/137; 501/134; 501/135; 501/136; 501/138; 501/139; 501/152; 252/520; 252/521; 423/263
[58] Field of Search ............... 501/134, 135, 136, 137, 501/138, 139, 152; 252/520, 521; 423/263

[56] References Cited

U.S. PATENT DOCUMENTS

| | | | |
|---|---|---|---|
| 3,997,479 | 12/1976 | Shimojo et al. | 252/520 |
| 4,535,064 | 8/1985 | Yoneda | 501/138 |
| 4,537,865 | 8/1985 | Okabe et al. | 501/135 |
| 4,677,083 | 6/1987 | Uedaira et al. | 423/598 |
| 4,987,107 | 1/1991 | Narumi et al. | 501/137 |

Primary Examiner—Mark L. Bell
Assistant Examiner—Michael A. Marcheschi
Attorney, Agent, or Firm—Ostrolenk, Faber, Gerb & Soffen

[57] ABSTRACT

A nonreducible dielectric ceramic composition of a system, $(A_{1-x}R_x)_yBO_3$, is prepared by preparing a slurry containing at least one compound selected from the group consisting of carbonates and hydroxides of Ba, Sr, Ca and Mg, at least one compound selected from the group consisting of carbonates and hydroxides of rare earth elements R, and at least one compound selected from the group consisting of oxides, carbonates and hydroxides of Ti, Zr and Sn; filtering the resulting slurry; washing the filter cake with water and calcining the resulting washed cake.

13 Claims, No Drawings

METHOD FOR PRODUCTION OF NONREDUCIBLE DIELECTRIC CERAMIC COMPOSITION

BACKGROUND OF THE INVENTION

1. Field of the Invention

The present invention relates to a method for production of a nonreducible dielectric ceramic composition and, more particularly, it relates to a method for production of a nonreducible dielectric ceramic composition suitable as a dielectric material for monolithic ceramic capacitors of the kind wherein internal electrodes are of a base metal such as, for example, nickel.

2. Description of the Prior Art

In general, dielectric ceramic materials of the prior are reduced to a semiconductor when fired in a neutral or reducing atmosphere with a low-oxygen partial pressure. Thus, it is essential for such a dielectric material to fire in an oxidizing atmosphere. If such a dielectric ceramic material is applied to monolithic ceramic capacitors, a material for internal electrodes to be used is required to have a high melting point and high resistance to oxidation at a high sintering temperature of not less than 1100° C. To this end, noble metals such as palladium, platinum have widely been used as a material for internal electrodes of the monolithic ceramic capacitors, but use of such a noble metal has become a bar to reduction of the cost of monolithic ceramic capacitors.

To solve such a problem, it has been proposed to use inexpensive base metals such as nickel as a material for internal electrodes. Since such a material is easily oxidized in the conventional sintering atmosphere, it is required to fire the ceramic material in neutral or reducing atmospheres with a low partial pressure of oxygen to prevent internal electrodes from oxidation during sintering. It is therefore required to use a nonreducible dielectric ceramic material which is not semiconductorized even if fired in a neutral or reducing atmosphere with a low partial pressure of oxygen, and which possesses high insulating resistance and excellent dielectric properties enough to use it as a dielectric material for capacitors.

Japanese patent publication No. Hei 2-63664 discloses a nonreducible dielectric ceramic composition consisting essentially of barium titanate and containing Ce incorporated therein. This material is never reduced even in a reducing atmosphere, and has small grain size and high dielectric constant.

Such a dielectric ceramic material has generally been manufactured by the conventional powder method employing carbonates and/or oxides of the respective components as raw materials. In this method, the raw materials are mixed in given molar ratios, milled the wet process and then calcined.

However, it is difficult with the conventional method to produce a ceramic material with a uniform composition as grain sizes of raw materials can not be reduced to less than 1 μm. Thus, if the powder method of the prior art is applied to production of a solid solution of barium titanate containing a rare earth element, atoms of the rare earth element do not diffuse uniformly into the solid solution by calcination, resulting in the local increase in the concentration of the rare earth element.

As is known, barium titanate is changed from an insulator to a semiconductor by the presence of an excess amount of the rare earth element. Thus, the local increase of the rare earth element concentration causes production of a partially semiconductorized solid solution of barium titanate, resulting in decrease in the reliability of the monolithic ceramic capacitors.

SUMMARY OF THE INVENTION

It is therefore an object of the present invention to provide a method for production of nonreducible dielectric ceramic material with a homogeneous composition which makes it possible to manufacture monolithic ceramic capacitors with high reliability.

Another object of the present invention is to provide a method for production of nonreducible dielectric ceramic compositions of a perovskite structure expressed by the general formula:

$$(A_{1-x}R_x)_y BO_3$$

wherein A is at least one element selected from the group consisting of Ba, Sr, Ca and Mg, R is at least one rare earth element, and B is at least one element selected from the group consisting of Ti, Zr and Sn, x and y take respective values in the following ranges: $0.001 \leq x \leq 0.020$, $1.002 \leq y \leq 1.03$.

DETAILED EXPLANATION OF THE INVENTION

These and other objects of the present invention are achieved by preparing a slurry containing at least one compound of elements A selected from the group consisting of carbonates and hydroxides of Ba, Sr, Ca and Mg, at least one compound of elements R selected from the group consisting of carbonates and hydroxides of rare earth elements R, and at least one compound of elements B selected from the group consisting of oxides, carbonates and hydroxides of Ti, Zr and Sn;

filtering out resulting slurry;
washing the resulting filter cake with water; and
calcining the washed cake.

According to the present invention there is provided a method for production of nonreducible dielectric ceramic compositions of a perovskite structure expressed by the general formula:

$$(A_{1-x}R_x)_y BO_3$$

wherein A is at least one element selected from the group consisting of Ba, Sr, Ca and Mg, R is at least one rare earth element, and B is at least one element selected from the group consisting of Ti, Zr and Sn, x and y take respective values in the following ranges: $0.001 \leq x \leq 0.020$, $1.002 \leq y \leq 1.03$, said method comprising the steps of preparing a slurry containing at least one compound of elements A selected from the group consisting of carbonates and hydroxides of Ba, Sr, Ca and Mg, at least one compound of elements R selected from the group consisting of carbonates and hydroxides of rare earth elements R, and at least one compound of elements B selected from the group consisting of oxides, carbonates and hydroxides of Ti, Zr and Sn;

filtering out resulting slurry;
washing the resulting filter cake with water; and
calcining the washed cake.

The slurry containing the above at least one compound of elements A, at least one compound of elements R and at least one compound of elements B may be prepared by the steps of preparing a slurry A containing either a carbonate or a hydroxide of at least one element A selected from the group consisting of Ba, Sr, Ca and Mg; preparing a slurry R containing either a carbonate or a hydroxide of at least one rare earth element, by the liquid phase reaction; preparing a slurry B containing at least one compound selected from the group consisting of oxides, carbonates and hydroxides of Ti, Zr and Sn; and mixing the resultant slurries A, R and B.

The slurry A may be prepared from an aqueous solution of at least one inorganic salt of elements A by addition of an aqueous solution of an alkali carbonate, an alkali hydroxide or an amine. As an inorganic salt of element A, there may be used those such as nitrates, chlorides, iodides, fluorides, carboxylates for example.

The slurry R may be prepared from an aqueous solution of at least one water-soluble inorganic salt of elements R by addition of an aqueous solution of an alkali carbonate or alkali hydroxide. As an inorganic salt of element R, there may be used those such as nitrates, chlorides, iodides, fluorides and carboxylates.

The slurry B may be prepared from an aqueous solution of at least one water-soluble inorganic salt of elements B by addition of an aqueous solution of an alkali carbonate or alkali hydroxide. As an inorganic salt of element B, there may be used those such as nitrates, chlorides, iodides, fluorides and carboxylates. Also, the slurry B may be prepared by dispersing at least one oxide of elements B in a suitable amount of water.

In any cases, a primary factor in determining whether elements A and R should be precipitated in the form of a carbonate or a hydroxide is the stability of a compound to be produced.

If elements A and R are to be precipitated as a carbonate, this may be done by adding an aqueous solution of an alkali carbonate to the aqueous solution of a water-soluble inorganic salt of element A or R until the pH of the resultant solution reaches to 9 and above. Typical alkali carbonates include, without being limited to, sodium carbonate, potassium carbonate, ammonium carbonate and the like. The carbonate of elements A and R may be also precipitated by blowing carbon dioxide into each aqueous solution of the elements A and R.

If elements A and R are to be precipitated as hydroxides, this may be done by adding an aqueous solution of an alkali hydroxide or an amine to the aqueous solution of an inorganic salt of element A or R until the pH of the resultant solution reaches to 9 and above. Typical alkali hydroxides include, without being limited to, sodium hydroxide, potassium hydroxide and ammonium hydroxide. Typical amines include, without being limited to, isopropyl amines, ethyl amines, propylamines, 3-ethoxypropylamine, 3-methoxypropylamine.

The slurry A and slurry R may be simultaneously prepared by dissolving inorganic salts of elements A and R in the predetermined molar ratio in water to prepare an aqueous solution containing ions of elements A and R, and then adding an aqueous solution of an alkali carbonate, an alkali hydroxide or an amine to the aqueous solution containing ions of elements A and R.

The thus prepared carbonates and/or hydroxides of elements A and R have a considerably small particle size of the order of 0.01 μm, thus making it possible to considerably improve the miscibility between two elements A and R. This ensured uniform diffusion of the rare earth element R into grains of the produced ceramic material.

This slurry B is uniformly mixed with the slurry A and slurry R by milling or a suitable means. The resultant mixture is filtered, washed with water, calcined and then crushed to prepare calcined power of the dielectric ceramic material.

The dielectric ceramic composition to be produced by the method of the present invention has been limited to those having the compositional proportions defined as above for the following reasons. If x, i.e., a mole fraction of the rare earth element in the $(A_{1-x}R_x)$ site, is less than 0.001, the reliability is scarcely improved by addition of the rare earth element. If x exceeds 0.02, the reliability becomes lowered. If y, i.e., the molar ratio of $(A_{1-x}R_x)$ site to B site, is less than 1.002, the composition is apt to be semiconductorized and is considerably lowered in the reliability. If y exceeds 1.03, the sintering property becomes lowered.

If necessary, the dielectric ceramic composition according to the present invention may contain a certain of $SiO_2$ incorporated therein as a mineralizer. Also, the composition may further contain a suitable amount of MnO and/or $Cr_2O_3$ incorporated therein to improve its insulating resistance.

The present invention makes it possible to produce the dielectric ceramic material having small grain size and a homogeneous composition, thus making it possible to produce monolithic ceramic capacitors with high reliability and improved mean time to failure which is an order of magnitude larger than that of the capacitors produced by the conventional method. The dielectric ceramic composition produced by the method of the present invention is scarcely reduced even in a reducing atmosphere, thus making it possible to produce monolithic ceramic capacitors with internal electrodes of inexpensive nickel. Further, the composition of the present invention makes it possible to considerably reduce the thickness of dielectric ceramic layers of the monolithic ceramic capacitors because of its fine grain size, thus making it possible to produce small-sized, high capacitance multilayer ceramic capacitors without causing decrease in the reliability.

The above and other objects, features and advantages of the present invention will become apparent from the following description in connection with several examples.

EXAMPLE 1

Using $BaCl_2$, $SrCl_2$, $MgCl_2$, $CeCl_3$, highly purified oxides (purity: >99.8%) of $TiO_2$ and $ZrO_2$ as raw materials, there was prepared a dielectric ceramic composition of $(Ba_{0.787}Sr_{0.198}Mg_{0.005}Ce_{0.010})_{1.01}(Ti_{0.90}Zr_{0.10})O_3$ in the follow manner: First, an aqueous solution of barium chloride was prepared by dissolving 827.6 parts by weight of $BaCl_2$ in water. Similarly, there were prepared aqueous solutions containing 158.5 parts by weight of $SrCl_2$, 2.38 parts by weight of $MgCl_2$, and 10.55 parts by weight of $CeCl_3$, respectively. The resultant solutions were mixed together and then added with an aqueous solution of sodium carbonates ($Na_2CO_3$) to adjust its pH value to 10 to 12, thereby precipitating $BaCO_3$, $SrCO_3$, $MgCO_3$ and $Ce_2(CO_3)_3$. The precipitate was filtered off and washed with water to prepare a slurry composed of a mixture of $BaCO_3$, $SrCO_3$, $MgCO_3$ and $Ce_2(CO_3)_3$.

Separate from the above, 359.4 parts by weight of $TiO_2$ and 61.6 parts by weight of $ZrO_2$ were placed in a ball mill together with 1000 ml of pure water and 2000 g of zirconia balls of a 5 mm diameter, milled for 16 hours, added with the above washed slurry, and then further milled for 4 hours. The resultant slurry was filtered, dried by evaporation, calcined at 1100° C. for 2 hours, and then crushed to prepare calcined powder of the dielectric ceramic composition.

An analysis of the resultant calcined powder by the X-ray microanalyzer showed no presence of Ce not yet reacted. Further, an analysis of ceramic dielectrics prepared by firing this calcined powder in a reducing atmosphere showed uniform distribution of rare earth element in the crystal lattice of the perovskite structure, $ABO_3$.

Using the resultant calcined powder, there were prepared monolithic ceramic capacitor chips in the following manner. The calcined powder (200 parts by weight) was milled together with a suitable amount of an organic binder and a suitable amount of an organic solvent, formed into a sheet by the Doctor blade, dried and then cut to prepare ceramic green sheets of a 15 μm thickness.

Each ceramic green sheet was provided on its one surface with a conductive layer of Ni paste for internal electrodes by the screen printing process. Subsequently, 10 sheets of the printed green sheets were stacked, pressed and then cut to prepare green chips for monolithic capacitors. The green chips were heated to and maintained at 300° C. for 2 hours at a partial pressure of oxygen of 100 ppm to remove the binder, and then fired at a temperature of 1250° to 1300° C. for 2 hours in a reducing atmosphere with a controlled oxygen pressure of $3 \times 10^{-8}$ to $3 \times 10^{-10}$ atm to prepare monolithic capacitor chips.

External electrodes were formed on opposite sides of the stacked ceramic layers and connected to the internal electrodes in the conventional manner to prepare test specimens.

For each specimen, the measurements were made on capacitance, dielectric loss (tan δ), insulating resistance (IR), and mean time to failure (MTTF). Dielectric constant and dielectric loss (tan δ) were measured at 25° C., 1 KHz and 1 Vrms, and dielectric constant (ε) was calculated from the measured capacitance. The value of MTTF was measured under the conditions of 150° C. and 4 WV. Results are as follows:

| Capacitance | 83 nF |
|---|---|
| ε | 12400 |
| tan δ | 2.7% |
| log IR | 11.1 |
| MTTF | 35.5 hr |

COMPARATIVE EXAMPLE 1

Highly purified raw materials (purity: not less than 98%), $BaCO_3$, $SrCO_3$, $MgCO_3$, $CeO_2$, $TiO_2$ and $ZrO_2$ as raw materials, there was prepared a mixture composed of 784.4 parts by weight of $BaCO_3$, 147.6 parts by weight of $SrCO_3$, 2.11 parts by weight of $MgCO_3$, 8.61 parts by weight of $CeO_2$, 359.4 parts by weight of $TiO_2$ and 61.6 parts by weight of $ZrO_2$. The resultant mixture was put into a ball mill, milled for 16 hours along with 1000 ml of pure water and 2000 g of zirconia balls with a 5 mm diameter, filtered, dried by evaporation, and then calcined at 1180° C. for 2 hours to prepare calcined powder of a dielectric ceramic composition of a system, $(Ba_{0.787}Sr_{0.198}Mg_{0.005}Ce_{0.010})_{1.01}(Ti_{0.90}Zr_{0.10})O_3$.

An analysis of the resultant calcined powder by the X-ray microanalyzer showed presence of Ce not yet reacted.

Using the resultant calcined power, capacitor chips were prepared and subjected to measurements of electric properties in the same manner as Example 1. Results are as follows:

| Capacitance | 80 nF |
|---|---|
| ε | 11900 |
| tan δ | 3.7% |
| log IR | 10.5 |
| MTTF | 1.3 hr |

From the comparison of experimental results for Example 1 with those for comparative example, it will be seen that the dielectric ceramic composition according to the present invention is much superior in the mean time to failure as compared with the dielectric ceramic composition produced by the conventional method.

EXAMPLE 2

Aqueous solutions of barium nitrate and calcium nitrate were prepared by respectively dissolving 1221.6 parts by weight of $Ba(NO_3)_2$, and 94.4 parts by weight of $Ca(NO_3)_2 \cdot 4H_2O$ in a certain amount of water. The resultant solutions were mixed together and then added with an aqueous solution of sodium carbonates ($Na_2CO_3$) to adjust pH of the mixed solution, thereby precipitating $BaCO_3$ and $CaCO_3$. The precipitate was filtrated and then washed with water to prepare a slurry of $BaCO_3$ and $CaCO_3$.

Separate from the above, an aqueous solution of neodymium chloride was prepared by dissolving 8.97 parts by weight of $NdCl_3 \cdot 6H_2O$ in water, added with a certain amount of $H_2O_2$ as a stabilizer and then added with $NH_4OH$ to adjust the pH value, thereby precipitating neodymium hydroxide. The resultant precipitate was filtrated and then washed with water to prepare a slurry of neodymium hydroxide.

Then, using highly purified $TiO_2$, $ZrO_2$ and $SnO_2$ (purity: not less than 99.8%), there was prepared a slurry containing 343.4 parts by weight of $TiO_2$, 77.1 parts by weight of $ZrO_2$ and 11.30 parts by weight of $SnO_2$ in the following manner. The oxides were put into a ball mill, added with 1000 ml of pure water and 2000 g of zirconia balls with a 5 mm diameter, and milled for 16 hours.

This slurry was added with the slurry of $BaCO_3$ and $CaCO_3$ and the slurry of neodymium hydroxide, and then milled for 4 hours. The mixed slurry was filtered, dried by evaporation, calcined at 1150° C. for 3 hours and then crushed. The calcined powder is a dielectric ceramic composition of a system $(Ba_{0.917}Ca_{0.078}Nd_{0.005})_{1.02}(Ti_{0.860}Zr_{0.125}Sn_{0.015})O_3$.

Using the calcined power, capacitor chips were prepared and subjected to measurements of electric properties in the same manner as Example 1. Results are as follows:

| Capacitance | 85 nF |
|---|---|
| ε | 13300 |
| tan δ | 4.8% |
| log IR | 11.0 |
| MTTF | 28.7 hr |

EXAMPLE 3

Aqueous solutions were prepared by respectively dissolving 747.10 parts by weight of $Ba(CH_3COO)_2$, 423.2 parts by weight of $Sr(NO_3)_2$ and 11.10 parts by weight of $CaCl_2$ in water, mixed together and then added with an aqueous solution of $Na_2CO_3$ to adjust the pH value, thereby precipitating $BaCO_3$, $SrCO_3$ and $CaCO_3$. The precipitate was filtrated and then washed with water to prepare slurry A containing $BaCO_3$, $SrCO_3$ and $CaCO_3$.

Separate from the above, an aqueous solution of $DyCl_3$ was prepared by dissolving 26.88 parts by weight of $DyCl_3$ in water and then adding a certain amount of $H_2O_2$ as a stabilizer. The solution was then added with an aqueous solution of NaOH to adjust the pH, thereby precipitating dysprosium hydroxide. The resultant precipitate was filtered off and then washed with water to prepare slurry R containing dysprosium hydroxide.

Then, using the same material as that of Example 1, there was prepared the third slurry B containing 391.4 parts by weight of $TiO_2$ and 12.32 parts by weight of $ZrO_2$ in the same manner as Example 1. Slurry B was added with slurries A and R, and then milled for 4 hours. The resultant slurry was filtrated, dried by evaporation, calcined at 1100° C. for 3 hours and then crushed to prepare calcined powder of a dielectric ceramic composition, $(Ba_{0.57}Sr_{0.39}Ca_{0.02}Dy_{0.02})_{1.025}(Ti_{0.98}Zr_{0.02})O_3$.

Using the resultant calcined power, capacitor chips were prepared and subjected to measurements of electric properties in the same manner as Example 1. Results are as follows:

| | |
|---|---|
| Capacitance | 92 nF |
| $\epsilon$ | 14500 |
| tan $\delta$ | 1.5% |
| log IR | 10.8 |
| MTTF | 40.5 hr |

EXAMPLE 4

Aqueous solutions were respectively prepared by dissolving 848.6 parts by weight of $BaCl_2$, 142.7 parts by weight of $SrCl_2$, 2.38 parts by weight of $MgCl_2$, and 12.32 parts by weight of $CeCl_3$ in water, and then mixed together. The resultant mixed solution was then added with an aqueous solution of sodium carbonates ($Na_2CO_3$) to adjust the pH value, thereby precipitating $BaCO_3$, $SrCO_3$, $MgCO_3$ and $Ce_2(CO_3)_3$. The precipitate was filtered off and washed with water to prepare a slurry containing $BaCO_3$, $SrCO_3$, $MgCO_3$ and $Ce_2(CO_3)_3$.

Separate from the above, aqueous solutions each containing titanium ions or zirconium ions were respectively prepared by dissolving 872.6 parts by weight of $TiCl_4$ and 128.9 parts by weight of $ZrOCl_2 \cdot 8H_2O$ in water, mixed together, and then added with a suitable amount of 30% $H_2O_2$ as a stabilizer. The mixed solution was added with an aqueous solution of sodium hydroxide (NaOH) to adjust its pH value, thereby precipitating titanium hydroxide and zirconium hydroxide. The precipitate was filtered off and then washed with water to prepare a slurry containing titanium hydroxide and zirconium hydroxide.

The thus prepared slurries were then mixed together, dried at 110° C., and then calcined at 1100° C. for 2 hours to prepare calcined powder of a dielectric ceramic composition of a system, $(Ba_{0.807}Sr_{0.178}Mg_{0.005}Ce_{0.010})_{1.01}(Ti_{0.920}Zr_{0.080})O_3$.

An analysis of the resultant calcined powder by the X-ray microanalyzer showed no presence of Ce not yet reacted. Further, an analysis of ceramic dielectrics prepared by firing this calcined powder in a reducing atmosphere showed uniform distribution of rare earth element in the crystal lattice of the perovskite structure, $ABO_3$.

Using the resultant calcined power, capacitor chips were prepared and subjected to measurements of electric properties in the same manner as Example 1. Results are as follows:

| | |
|---|---|
| Capacitance | 81 nF |
| $\epsilon$ | 12100 |
| tan $\delta$ | 2.5% |
| log IR | 11.2 |
| MTTF | 41.1 hr |

EXAMPLE 5

Aqueous solutions of barium nitrate and calcium nitrate were prepared by respectively dissolving 1234.8 parts by weight of $Ba(NO_3)_2$, and 82.7 parts by weight of $Ca(NO_3)_2 \cdot 4H_2O$ in water, mixed together and then added with an aqueous solution of sodium carbonates ($Na_2CO_3$) to adjust its pH value, thereby precipitating $BaCO_3$ and $CaCO_3$.

Separate from the above, aqueous solutions of $NdCl_3$, $TiCl_4$, $ZrOCl_2$ and $SnCl_4$ were respectively prepared by dissolving 8.97 parts by weight of $NdCl_3 \cdot 6H_2O$, 815.7 parts by weight of $TiCl_4$, 193.3 parts by weight of $ZrOCl_2 \cdot 8H_2O$, 26.1 parts by weight of $SnCl_4$ in water. The solutions were mixed together, added with a suitable amount of 30% $H_2O_2$ as a stabilizer and then added with $NH_4OH$ to adjust its pH value, thereby precipitating ions of Nd, Ti, Zr and Sn as hydroxides.

The resultant slurry of carbonates and slurry of hydroxides were mixed together, filtered off and then washed with water repeatedly. The mixed slurry was dried at 110° C., and then calcined at 1150° C. for 2 hours to prepare calcined powder of a dielectric ceramic composition of a system, $(Ba_{0.926}Ca_{0.069}Nd_{0.005})_{1.02}(Ti_{0.860}Zr_{0.120}Sn_{0.020})O_3$.

An analysis of the resultant calcined powder by the X-ray microanalyzer showed no presence of Nd not yet reacted. Further, an analysis of ceramic dielectrics prepared by firing this calcined powder in a reducing atmosphere showed uniform distribution of rare earth element in the crystal lattice of the perovskite structure, $ABO_3$.

Using the resultant calcined power, capacitor chips were prepared and subjected to measurements of electric properties in the same manner as Example 1. Results are as follows:

| | |
|---|---|
| Capacitance | 87 nF |
| $\epsilon$ | 13500 |
| tan $\delta$ | 4.7% |
| log IR | 11.1 |
| MTTF | 30.3 hr |

EXAMPLE 6

Aqueous solutions of $Ba(CH_3COO)_2$, $Sr(NO_3)_2$ and $CaCl_2$ were prepared by respectively dissolving 711.3 parts by weight of Ba(CH$_3$COO)$_2$, 423.2 parts by weight of Sr(NO$_3$)$_2$, and 27.7 parts by weight of CaCl$_2$ in water, mixed together and then added with an aqueous solution of Na$_2$CO$_3$ to adjust the pH, thereby precipitating BaCO$_3$, SrCO$_3$ and CaCO$_3$.

Separate from the above, aqueous solutions of DyCl$_3$, TiCl$_4$, SnCl$_4$ and Sm(NO$_3$)$_3$ were prepared by respectively dissolving 13.44 parts by weight of DyCl$_3$, 17.78 parts by weight of Sm(NO$_3$)$_3$·6H$_2$O, 929.5 parts by weight of TiCl$_4$, and 26.1 parts by weight of SnCl$_4$ in water, mixed together, and then added a certain amount of H$_2$O$_2$ as a stabilizer. The resultant mixed solution was added with an aqueous solution of NaOH to adjust the pH, thereby precipitating ions of Dy, Ti, Sn and Sm as hydroxides.

The resultant slurry of carbonates and slurry of hydroxides were mixed together, filtered off and then washed with water repeatedly. The mixed slurry was dried at 110° C., and then calcined at 1200° C. for 2 hours to prepare calcined powder of a dielectric ceramic composition of a system, (Ba$_{0.543}$Sr$_{0.0390}$Ca$_{0.049}$Dy$_{0.010}$Sm$_{0.008}$)$_{1.025}$(Ti$_{0.980}$Zr$_{0.020}$)O$_3$.

An analysis of ceramic dielectrics prepared by firing this calcined powder in a reducing atmosphere showed uniform distribution of rare earth element in the crystal lattice of the perovskite structure, ABO$_3$.

Using the resultant calcined power, capacitor chips were prepared and subjected to measurements of electric properties in the same manner as Example 1. Results are as follows:

| Capacitance | 82 nF |
| ε | 12200 |
| tan δ | 1.1% |
| log IR | 11.0 |
| MTTF | 44.5 hr |

As can be seen from above results, the MTTF of the dielectric ceramic compositions produced by the method of the present invention ranges from 28.8 to 44.5 hours, whereas that of the compositions produced by the conventional method is very short and 1.3 hours.

What is claimed is:

1. A non-reducible dielectric ceramic composition of a perovskite structure expressed by the general formula:

$$(A_{1-x}R_x)_yBO_3$$

wherein A is at least one element selected from the group consisted of Ba, Sr, Ca and Mg, R is at least one rare earth element, and B is at least one element selected from the group consisting of Ti, Zr and Sn, and wherein x and y take respective values in the following ranges: $0.001 \leq x \leq 0.020$, $1.002 \leq y \leq 1.03$, said composition being produced by a method comprising the steps of
   (a) precipitating either at least one carbonate or at least on hydroxide of element A by liquid phase reaction to prepare a slurry A;
   (b) precipitating either at least one carbonate or at least one hydroxide of rare earth element R by liquid phase reaction to prepare a slurry R;
   (c) preparing a slurry B containing at least one compound selected from the group consisting of oxides, carbonates and hydroxides of Ti, Zr and Sn;
   (d) mixing said slurries A, R and B to prepare a mixed slurry;
   (e) filtering the mixed slurry to form a filter cake;
   (f) washing the filter cake with water; and
   (g) calcining the washed cake.

2. The nonreducible dielectric ceramic composition according to claim 1, wherein said slurry A is prepared by adding an aqueous solution of a compound selected from the group consisting of alkali carbonates, alkali hydroxides and amines to an aqueous solution of at least one salt of element A to precipitate at least one carbonate or hydroxide of element A.

3. The nonreducible dielectric ceramic composition according to claim 2, wherein said at least one salt of element A is selected from the group consisting of nitrates, chlorides, iodides, fluorides and carboxylates.

4. The nonreducible dielectric ceramic composition according to claim 2, wherein said alkali hydroxides are selected from the group consisting of sodium hydroxide, potassium hydroxide and ammonium hydroxide.

5. The nonreducible dielectric ceramic composition according to claim 2, wherein said amines are selected from the group consisting of isopropyl amines, ethyl amines, propylamines, 3-ethoxy-propylamine and 3-methoxypropylamine.

6. The nonreducible dielectric ceramic composition according to claim 1, wherein said slurry R is prepared by addition of an aqueous solution of a compound selected from the group consisting of alkali carbonates, alkali hydroxides and amines to an aqueous solution of at least one salt of rare earth element R to precipitate either at least one carbonate or hydroxide of rare earth element R.

7. The nonreducible dielectric ceramic composition according to claim 6, wherein said at least one water-soluble salt of rare earth element R is selected from the group consisting of nitrates, chlorides, iodides, fluorides and carboxylates.

8. The nonreducible dielectric ceramic composition according to claim 1, wherein said slurry B is prepared by dispersing at least one oxide of element B in water.

9. The nonreducible dielectric ceramic composition according to claim 1, wherein said slurry B is prepared by adding an aqueous solution of a compound selected from the group consisting of alkali carbonates, alkali hydroxides and amines to an aqueous solution of at least one salt of said element B to precipitate at least one carbonate or hydroxide of Ti, Zr or Sn.

10. The nonreducible dielectric ceramic composition according to claim 9, wherein said at least one salt of element B is selected from the group consisting of nitrates, chlorides, iodides, fluorides and carboxylates.

11. The nonreducible dielectric ceramic composition according to claim 1, wherein said slurry A is prepared by adding an aqueous solution of an alkali carbonate to an aqueous solution of at least one inorganic salt of Ba, Sr, Ca and Mg, and wherein said slurry R is prepared by adding an aqueous solution of an alkali carbonate to an aqueous solution of at least one inorganic salt of rare earth element R.

12. The nonreducible dielectric ceramic composition according to claim 1, wherein said slurry R is prepared simultaneously with said slurry A by adding an aqueous solution of an alkali carbonate to an aqueous solution containing ions of elements A and R.

13. The nonreducible dielectric ceramic composition according to claim 1, wherein said slurry R is prepared simultaneously with said slurry B by adding an aqueous solution of an alkali carbonate to an aqueous solution containing ions of elements R and B.

* * * * *